US012591504B2

(12) United States Patent
Lamour et al.

(10) Patent No.: US 12,591,504 B2
(45) Date of Patent: Mar. 31, 2026

(54) METHOD AND APPARATUS FOR MONITORING—WITH CONTENTION MITIGATION—AVIONICS APPLICATION(S) RUNNING ON A PLATFORM WITH MULTI-CORE PROCESSOR, RELATED ELECTRONIC AVIONICS SYSTEM AND COMPUTER PROGRAM

(71) Applicant: THALES, Meudon (FR)

(72) Inventors: Pierrick Lamour, Merignac (FR);
Nicolas Leonardi, Merignac (FR)

(73) Assignee: THALES, Meudon (FR)

( * ) Notice: Subject to any disclaimer, the term of this patent is extended or adjusted under 35 U.S.C. 154(b) by 38 days.

(21) Appl. No.: 18/401,710

(22) Filed: Jan. 2, 2024

(65) Prior Publication Data

US 2024/0232052 A1      Jul. 11, 2024

(30) Foreign Application Priority Data

Jan. 9, 2023    (FR) ...................................... 2300212

(51) Int. Cl.
| | |
|---|---|
| *G06F 11/30* | (2006.01) |
| *G06F 11/34* | (2006.01) |
| *G06F 11/362* | (2025.01) |

(52) U.S. Cl.
CPC ........ *G06F 11/366* (2013.01); *G06F 11/3013* (2013.01); *G06F 11/3409* (2013.01); *G06F 11/3636* (2013.01); *G06F 2201/865* (2013.01)

(58) Field of Classification Search
CPC .. G06F 11/366; G06F 11/3636; G06F 11/376; G06F 11/3612; G06F 11/3013;
(Continued)

(56) References Cited

U.S. PATENT DOCUMENTS

| | | | |
|---|---|---|---|
| 2008/0134184 A1* | 6/2008 | Fedorova | .............. G06F 9/4881 |
| | | | 718/102 |
| 2009/0031314 A1* | 1/2009 | Moscibroda | .............. G06F 9/52 |
| | | | 711/E12.001 |

(Continued)

FOREIGN PATENT DOCUMENTS

| | | |
|---|---|---|
| EP | 3399720 A1 | 11/2018 |
| EP | 4060503 A1 | 9/2022 |

OTHER PUBLICATIONS

"CPU cache." in: Wikipedia. Dec. 10, 2022 [online]. Retrieved from the Internet <URL: https://en.wikipedia.org/w/index.php?title=CPU_cache&direction=prev&oldid=1134976474> (Year: 2022).*

(Continued)

*Primary Examiner* — Michael Maskulinski
*Assistant Examiner* — Bryan P Huang
(74) *Attorney, Agent, or Firm* — Soquel Group LLC

(57) ABSTRACT

A method for monitoring avionics software application(s) executed by an avionics platform, on-board an aircraft, including a multi-core processor and hosting an operating system, is implemented by an electronic monitoring device and includes, for each software application running, a monitoring phase including acquisition at least one characteristic variable value representative of a use of the platform, each acquired value being associated with the respective software application, comparison of each acquired value with a respective threshold corresponding to the characteristic variable, and stopping the execution of the respective software application if at least one acquired value is higher than the respective threshold.

14 Claims, 3 Drawing Sheets

(58) Field of Classification Search
CPC ...... G06F 11/302; G06F 9/52; G06F 11/3409;
G06F 2201/865
See application file for complete search history.

(56) References Cited

U.S. PATENT DOCUMENTS

| | | | |
|---|---|---|---|
| 2009/0138670 A1* | 5/2009 | Mutlu | G06F 13/1663 |
| | | | 711/E12.001 |
| 2010/0199280 A1* | 8/2010 | Vestal | G06F 9/52 |
| | | | 713/320 |
| 2011/0055479 A1* | 3/2011 | West | G06F 9/4881 |
| | | | 718/103 |
| 2012/0072199 A1* | 3/2012 | Kawahara | G06F 9/455 |
| | | | 703/21 |
| 2021/0133088 A1* | 5/2021 | Zaykov | G06F 13/1668 |
| 2021/0173721 A1* | 6/2021 | Sauvant | G06F 9/544 |

OTHER PUBLICATIONS

"Synchronous dynamic random-access memory." in: Wikipedia.
Dec. 13, 2022 [online]. Retrieved from the Internet <URL: https://
en.wikipedia.org/w/index.php?title=Synchronous_dynamic_random-
access_memory&oldid=1127182889> (Year: 2022).*
Iorga Dan et al: "Slow and Steady: Measuring and Tuning Multicore
Interference" , 2020 IEEE Real-Time and Embedded Technology
and Applications Symposium (RTAS), IEEE, Apr. 21, 2020 (Apr.
21, 2020), pp. 200-212.
FR 2300212, INPI Rapport de Recherche Preliminaire, Jul. 18,
2023, 2 pages.

* cited by examiner

METHOD AND APPARATUS FOR MONITORING—WITH CONTENTION MITIGATION—AVIONICS APPLICATION(S) RUNNING ON A PLATFORM WITH MULTI-CORE PROCESSOR, RELATED ELECTRONIC AVIONICS SYSTEM AND COMPUTER PROGRAM

CROSS-REFERENCE TO RELATED APPLICATIONS

This application is a U.S. non-provisional application claiming the benefit of French Application No. 23 00212, filed on Jan. 9, 2023, which is incorporated herein by reference in its entirety.

TECHNICAL FIELD OF THE INVENTION

The present invention relates to a method for monitoring avionics software application(s) apt to be executed by an avionics platform, the avionics platform being intended to be on-board an aircraft, including a multi-core processor and hosting an operating system, the method being implemented by an electronic monitoring device.

The invention further relates to a non-transitory computer-readable medium including a computer program including software instructions which, when executed by a computer, implement such a monitoring method.

The invention further relates to an avionics electronic system including a memory apt to store at least one avionics software application, a platform apt to execute each avionics software application, the platform hosting an operating system, and such an electronic device for monitoring each avionics software application.

The invention relates to the field of the safety of on-board avionics platforms, more particularly to the monitoring of software applications executed on such on-board avionics platforms.

BACKGROUND OF THE INVENTION

In the field of safety, the notion of determinism is strong, and the use of multi-core processors brings a significant difficulty for the qualification of platforms. Indeed, the simultaneous execution of a plurality of programs on the same processor is accompanied by risks of contentions due to the sharing of common resources (bus, memory), without the behavior of the processor, in particular when it is a multi-core processor, being easily controlled.

The term "contention" refers to any situation wherein at least one activity carried out by at least one core of a multi-core processor suffers delays in the execution thereof because of the time parallelism allowed by the multi-core processor.

The origin of contentions is generally the use of common resources of the processor or operating system, also called OS (Operating System) leading to queuing generating the delays. The effect of contention is then a delay in the execution of a software application hosted on a core.

A first example of contention is the bus (often called "interconnect") connecting the cores to each other, which does not always allow simultaneous transactions to take place between cores or between cores and peripherals, such as certain integrated caches or the external memory.

Another example of contention is the use of common OS software modules installed on one of the cores and called by the set of cores, potentially simultaneously. Simultaneous calls to such common software modules cause an arbitration and a queuing of certain requests in order to serialize the software processes on the core where the common software module is installed.

Another example of contention is a momentary interruption of all cores on a particular event on one of the cores in order to manage a consistent status between all cores.

When, furthermore, the processor is a processor purchased from a supplier, or COTS (Commercial Off-The-Shelf) processor, it is generally impossible to have access to the design details of the internal components of such a multi-core processor, and it is thus very difficult, or even impossible to guarantee a deterministic behavior of the processor.

For single-core processors, there are solutions for managing time allocation overruns of an application. With such solutions, even if there are several detection mechanisms, the platform then systematically kills an application when the application overruns the allocation thereof.

However, for multi-core processors, with such solutions, the application or applications killed are then the applications overrunning the allocation thereof, but not necessarily the application(s) causing the slowdown.

SUMMARY OF THE INVENTION

The goal of the invention is then to propose a method and a device for monitoring at least one avionics software application apt to be executed on an avionics platform, which makes it possible to monitor the at least one software application more effectively.

To this end, the subject matter of the invention is a method for monitoring avionics software application(s) apt to be executed by an avionics platform, the avionics platform being intended to be carried on-board an aircraft, including a multi-core processor and hosting an operating system, the process being implemented by an electronic monitoring device and including, for each software application being executed, a monitoring phase including the following operations:

acquisition of a value of at least one characteristic variable representative of a use of the platform, each acquired value of a characteristic variable being associated with the respective software application;

comparison of each acquired value with a respective threshold corresponding to the characteristic variable; and stopping the execution of the respective software application if at least one acquired value is higher than the respective threshold;

for each characteristic variable, the respective threshold is determined for a reference contending application during the execution of the reference contending application and a reference sensitive application during a preliminary phase; the reference contending application being apt to cause an increase in the execution time of the reference sensitive application according to a predefined contention ratio, the contention ratio being equal to the execution time of the reference sensitive application when executed at the same time as the reference contending application divided by a execution time of the reference sensitive application when executed alone by the platform; the preliminary phase preceding the monitoring phase of each software application.

The monitoring method according to the invention then makes it possible to anticipate the contention and to sanction the application or applications which are at the origin of the slowdowns experienced by the other application or applications.

In a context where a plurality of applications operate in parallel and where each application has to operate within a given time limit in order to ensure the deterministic execution thereof, the monitoring method according to the invention thus makes it possible, in the event of excessive contention, to act on applications causing the slowdown in order to prevent all applications from failing completely.

If the solution of the prior art were applied, any application overrunning the time budget thereof, i.e., the allocation thereof, would then be cut off. In such case, the origin of the problem would not be potentially cut off, because, potentially, it would not be the contending application that would be stopped.

The monitoring method according to the invention then makes it possible to determine which application/applications overruns/overrun a level of aggression acceptable to the other applications, the level of aggression corresponding to the predefined contention ratio, and each respective threshold, the exceeding of which initiates the stopping of the monitored application, being determined for the reference contending application which generates an increase in the execution time of the reference sensitive application according to the predefined contention ratio.

In other words, each respective threshold is determined from the reference contending application that characterizes a maximum acceptable contention level, i.e., the predefined contention ratio, with respect to other software application(s) executed in parallel on the platform with the multi-core processor.

According to other advantageous aspects of the invention, the monitoring method includes one or a plurality of the following features, taken individually or according to all technically possible combinations:

each characteristic variable and each associated respective threshold are each expressed per unit of time;

the platform includes memory resources including a random-access memory, a first level cache memory and a second level cache memory; and each characteristic variable is a variable representative of the use of memory resources;

each characteristic variable is chosen from the group consisting of: an occupied bandwidth of a RAM access bus; a number of first level cache faults; a number of second level cache faults; a number of third-level cache faults; a number of page changes in DDR mode; and a combination of the aforementioned variables;

during the preliminary phase, the reference contending application is an application formed by a contending loop executed several times, the contending loop including a plurality of write instructions in random-access memory, with a predefined write address jump for each instruction, the number of times the contending loop is preferentially equal to a second-level cache line size divided by a write address jump size;

during the preliminary phase, the reference sensitive application is an application formed by a sensitive loop executed a plurality of times, the sensitive loop including a plurality of read instructions in random-access memory, with a predefined read address jump for each instruction, the number of executions of the sensitive loop is preferentially equal to a row size of the second-level cache divided by a read address jump size.

during the acquisition operation, each value of a characteristic variable is acquired separately for each of the cores of the multi-core processor;

the acquisition and the comparison operations are reiterated at each call to the operating system; and the operating system is an operating system operating synchronously with periodic system events, and the acquisition and the comparison operations are reiterated during each system event.

The invention further relates to a non-transitory computer-readable medium including a computer program including software instructions which, when executed by a computer, implement a monitoring method as defined hereinabove.

The invention further relates to an electronic device for monitoring avionics software application(s) apt to be executed by an avionics platform, the avionics platform being intended to be carried on-board an aircraft, including a multi-core processor and hosting an operating system, the monitoring device including:

an acquisition module configured to acquire, for each software application being executed, a value of at least one characteristic variable representative of a use of the platform, each acquired value of a characteristic variable being associated with the respective software application;

a comparison module configured to compare, for each software application being executed, each acquired value with a respective threshold corresponding to the characteristic variable;

a stopping module configured to stop, for each software application being executed, the execution of the respective software application if at least one acquired value is higher than the respective threshold; and for each characteristic variable, the respective threshold is determined for a reference contending application during the execution of the reference contending application and a reference sensitive application during a preliminary phase; the reference contending application being apt to cause an increase in the execution time of the reference sensitive application according to a predefined contention ratio, the contention ratio being equal to the execution time of the reference sensitive application when executed at the same time as the reference contending application divided by a execution time of the reference sensitive application when executed alone by the platform; the preliminary phase preceding the monitoring of each software application.

A further subject matter of the invention is an avionics electronic system including:

a memory apt to store at least one avionics software application;

a platform apt to execute each avionics software application, the platform hosting an operating system; and an electronic monitoring device for each avionics software application, the electronic monitoring device being as defined hereinabove.

BRIEF DESCRIPTION OF THE DRAWINGS

These features and advantages of the invention will become clearer upon reading the following description, given only as a non-limiting example, and made with reference to the enclosed drawings, wherein.

DETAILED DESCRIPTION

Hereinafter in the description, the expression "substantially equal to" and "on the order of" each define a relation of equality within plus or minus 20%, preferentially within plus or minus 10%, preferentially still within plus or minus 5%.

Figure 1:
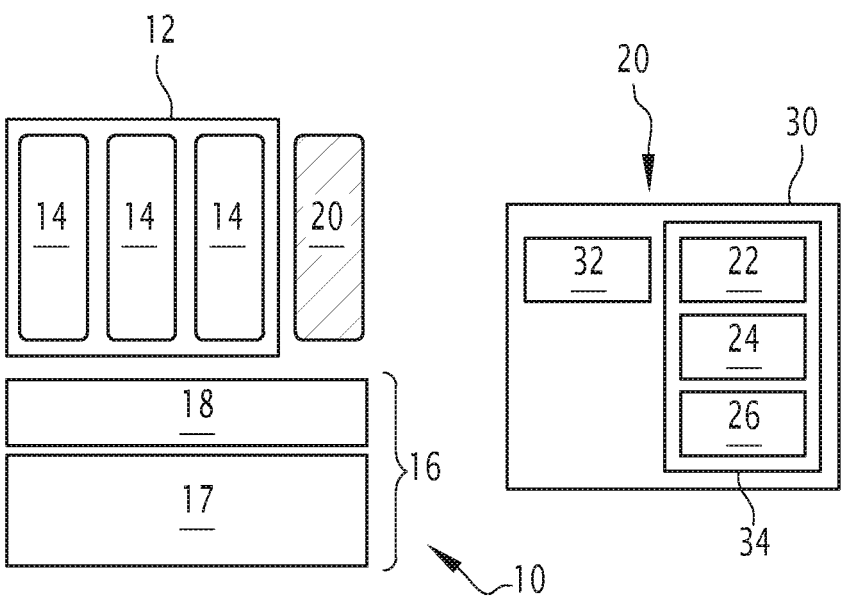
FIG. 1 is a schematic representation of an avionics electronic system according to the invention, including a memory apt to store at least one avionics software application, a platform apt to execute each avionics software application, the platform including resources and hosting an operating system, and an electronic device for monitoring each avionics software application.

In FIG. 1, an avionics electronic system 10, intended to be carried on-board an aircraft, includes a memory 12 apt to store at least one avionics software application 14, and a platform 16 apt to execute each avionics software application 14, the platform 16 including resources 17 and hosting an operating system 18.

The avionics electronic system 10 further includes, according to the invention, an electronic device 20 for monitoring avionics software application(s) 14.

The aircraft is preferentially an airplane. In a variant, the aircraft is a helicopter, or a drone which is remotely piloted by a pilot.

In the example shown in FIG. 1, the memory 12 is apt to store three distinct avionics software applications 14, and the electronic monitoring device 20 is then configured to monitor at least one avionics software application 14, and preferentially each of the avionics software applications 14.

Each avionics software application 14 is intended to be executed by the platform 16 and is then designed to send one or a plurality of calls to the operating system 18 hosted by the platform 16 and is also configured to use the resources 17 of the platform 16.

Each avionics software application 14 is also called an avionics function. The avionics software applications 14 have different functions for carrying out a flight, and are, e.g., installed on different platforms 16 and use the resources 17 of the platforms 16.

Since such functions are critical, such as e.g. the braking system or the flight management system, each avionics software application 14 is preferentially monitored regularly by the electronic monitoring device 20, for substantially the entire duration of execution of the avionics software application 14 by the platform 16.

The platform 16 is intended to be carried on-board the aircraft. The platform 16 is, e.g., an information processing unit formed of at least one multi-core processor suitable for executing the avionics software applications 14 and of one or a plurality of memories associated with the at least one multi-core processor.

The resources 17 of the platform 16 are physical or logical elements suitable for being made available to the avionics software application or applications 14. The resources 17 are divided e.g. into the following categories:

the data processing resources. Such resources are e.g. the computing power of a processor or the storage capacity of a memory.

input and output resources;

resources specific to the avionics network. Such resources are e.g. the communication routers of an ARINC664 network, more particularly ARINC664 Part 3 or ARINC664 Part 7;

graphic resources i.e. resources which can be used for a display. A screen is an example of such resources; and mass memory resources.

The operating system 18 is, e.g., an operating system as per the standard ARINC 653, or a POSIX operating system, or a hypervisor, or yet a middleware.

The skilled person would then understand that the operating system 18 is understood in the broad sense and is, more generally, a set of at least one basic software, designed to offer services of different types to each application 14.

A service is thus a function of the basic software that can be used by the application or applications 14 and that can be reached by a call, also called a service call (of the OS) or a system call. An example of basic software is an ARINC 653 or POSIX OS that provides such services. In the context of the invention, the skilled person would understand that it is the notion of calling a service that matters, and not the service as such, provided by the basic software.

The services provided by the operating system 18 are known per se and are e.g. input/output acquisition services, process management services, communication protocol management services, etc. The types of service are then the input/output acquisition, the process management, the communication protocol management and the management of timing, more particularly the initiation thereof.

The skilled person would note that the ARINC 653 and POSIX standards each include, e.g., a list of services generally used in the aeronautical field. However, the skilled person would note that the invention relates more generally to any basic software suitable for an avionics software application 14, insofar as the service or services provided by the basic software, as well as the call or calls to the service or services sent by each avionics software application 14, are identifiable.

The electronic monitoring device 20 is configured to monitor at least one avionics software application 14, and preferentially each avionics software application 14, apt to be executed on the platform 16.

For carrying out the monitoring, the electronic monitoring device 20 includes a module 22 for acquiring, for each software application 14 being executed, also denoted by Aj, a value of at least one characteristic variable Vi representative of a use of the platform 16; a module 24 for comparing, for each software application 14, Aj being executed, each value acquired with a respective threshold Si corresponding to the characteristic variable Vi; and a module 26 for stopping, for each monitored software application 14, Aj monitored, the execution of the respective software application 14, Aj, if at least one acquired value is higher than the respective threshold Si.

For the notation Vi associated with a respective characteristic variable, also called the respective characteristic variable, i is an index belonging to a set I containing all the indices of characteristic variable(s), taken into account. The skilled person would observe that the index i is likely to be a combined index, such as the index 1&2 in the example shown in FIG. 2, meaning in the present example that the combined characteristic variable V1&2 corresponding to a combination, such as a linear combination of characteristic variables V1, V2, is taken into account. In the example shown in FIG. 2, the combined characteristic variable V1&2 is taken into account in addition to the respective charac- teristic variables V1, V2.

The skilled person would further understand that when a combined characteristic variable is taken into account, then a combined threshold is provided and associated with the combined characteristic variable, the combined threshold being typically distinct from the respective thresholds asso- ciated with the respective characteristic variables involved in the combined characteristic variable. In other words, in the example shown in FIG. 2, the combined characteristic variable V1&2 is compared with a combined threshold S1&2, typically distinct from the respective thresholds S1, S2 (not shown), associated with the respective characteristic variables V1, V2.

For the notation Aj associated with a respective monitored avionics software application 14, j is an index belonging to a set J containing all the indices of the monitored avionics software applications 14.

In the example shown in FIG. 1, the monitoring device 20 is e.g. distinct from the platform 16, and includes an information processing unit 30 formed e.g. by a processor 32 associated with a memory 34.

In a variant, for which the monitoring device 20 is represented in hatched form in FIG. 1, the monitoring device 20 is apt to be executed directly by the platform 16 and to then to use the resources 17 thereof. Such variant is a preferred embodiment, and the monitoring device 20 is then preferentially also hosted within a specific memory partition of the platform 16, the specific partition itself being pro- tected against cyber-attacks, via e.g. one or a plurality of access controls and/or integrity protection. According to the variant wherein the monitoring device 20 is apt to be executed directly by the platform 16, the monitoring device 20 is e.g. included in the operating system 18.

In the example shown in FIG. 1, whether the monitoring device 20 is distinct from the platform 16, or hosted and executed by the platform 16, the acquisition module 22, the comparison module 24 and the stopping module 26 are each implemented in the form of a software program, or a software brick, which can be executed by a processor, such as the processor 32 when the monitoring device 20 is distinct from the platform 16. The memory 34 of the monitoring device 20 is then apt to store a software program, for each software application Aj, with a value of at least one char- acteristic variable Vi representative of a use of the platform 16; a software program for comparing, for each software application Aj being executed, each value acquired with a respective threshold Si corresponding to the characteristic variable Vi; and software for stopping, for each software application Aj monitored, the execution of the respective software application Aj if at least one acquired value is higher than the respective threshold Si.

In a variant (not shown) the acquisition module 22, the comparison module 24, and the stopping module 26 are each produced in the form of a programmable logic component, such as an FPGA (Field Programmable Gate Array), or further of a dedicated integrated circuit, such as an ASIC (Application Specific Integrated Circuit).

When the monitoring device 20 is produced in the form of one or a plurality of software programs, i.e., in the form of a computer program, same is further apt for being recorded on a computer-readable medium (not shown). The com- puter-readable medium is, e.g., a medium suitable for storing electronic instructions and apt to be coupled to a bus of a computer system. As an example, the computer-readable medium is a diskette or a floppy disk, an optical disk, a CD-ROM, a magneto-optical disk, a ROM, a RAM, any type of non-volatile memory (e.g. EPROM, EEPROM, FLASH, NVRAM), a magnetic card or an optical card. A computer program containing software instructions is then stored on the readable medium.

The acquisition module 22 is configured to acquire, for each software application 14, Aj being executed, a value of at least one characteristic variable Vi representative of the use of the platform 16, each acquired value of a character- istic variable Vi being associated with the respective soft- ware application 14, Aj.

The acquisition module 22 is preferentially configured to acquire each value of a characteristic variable Vi, separately for each of the cores of the multi-core processor.

Each characteristic variable Vi is typically a measurable performance element, also called a performance measure- ment register and denoted by PMR.

The platform 16 includes, within the memory resources thereof, a random-access memory, also called RAM; a first-level cache memory, also called L1 cache, and a sec- ond-level cache memory, also called L2 cache; each being connected to the multi-core processor of the platform.

Each characteristic variable Vi is advantageously a vari- able representative of the use of the memory resources, more particularly representative of the use of the random-access memory, or of the first level cache memory, or of the second level cache memory.

Each characteristic variable Vi is then chosen e.g. from the group consisting of: an occupied bandwidth of a RAM access bus; a number of L1 cache misses; a number of L2 cache misses; a number of L3 cache misses; a number of page changes in DDR mode; and a combination of the aforementioned variables.

As an advantageous supplement, each characteristic vari- able Vi and each associated respective threshold Si are each expressed per unit of time. Each characteristic variable Vi is then chosen, e.g., from the group consisting of: an occupied bandwidth of an access bus to the random-access memory, expressed per unit of time, a number of L1 cache misses per unit of time, a number of L2 cache misses, a number of L3 cache misses, a number of page changes in DDR mode per unit of time, and a combination of the aforementioned variables. Each respective associated threshold Si is then expressed in an analogous way.

According to such advantageous supplement, the acqui- sition module 22 is configured to acquire each value of a characteristic variable Vi by taking into account a duration of acquisition, in order to express each acquired value per unit of time. In other words, the acquisition module 22 is configured to acquire each value of a characteristic variable Vi during an acquisition time, by also acquiring the value of the acquisition duration, in order to then divide the acquired value of the characteristic variable Vi by the value of the duration of acquisition, to express the characteristic variable Vi acquired per unit of time.

The comparison module 24 is configured to compare, for each software application 14, Aj being executed, each acquired value with a respective threshold Si corresponding to the characteristic variable Vi.

According to the invention, for each characteristic vari- able Vi, the respective threshold Si is determined for a reference contending application, during the execution of both the reference contending application and a reference sensitive application, the determination being performed during a preliminary phase 100 preceding the monitoring of each software application 14, Aj.

The measurement of the contention is determined by a measurement of time between an application executed alone and the same application, using the same context of use, executed in parallel with at least one other application. From there, an application is typically characterized according to two criteria: sensitivity and aggressiveness.

Sensitivity is the influence that other applications may have on the measured application. It is proportional to a prolongation of the execution time, and hence to the contention.

Aggressiveness is the ability to slow down on-board applications. It is not influenced by other applications in the contention sense of the term, but can move according to the context of use of each application.

During the preliminary phase 100, a first application for characterizing the level of contention acceptable to the other applications is first determined, the first application also being called a sensitive reference application. A second application, also called a reference contending application, is then determined in order to characterize an acceptable level of contention level, the level of contention being predefined.

The level of contention is typically expressed as a contention ratio representing a prolongation of the execution time. The contention ratio is e.g. on the order of 130%, i.e., on the order of 1.3, representing a prolongation on the order of 30% with respect to a nominal execution time, without contention.

The reference contending application is then suitable for generating an increase in the execution time of the reference sensitive application according to the predefined contention ratio, the contention ratio being equal to the execution time of the reference sensitive application when executed at the same time as the reference contending application divided by an execution time of the reference sensitive application when executed alone by the platform 16.

In other words, if the predefined contention ratio is equal to 1.30, then the execution time of the sensitive application used in parallel with the reference contending application is 30% greater than the execution time of the same sensitive application executed alone.

The sensitive reference application aims to be the least aggressive possible. The reference sensitive application is e.g. an application formed by a sensitive loop executed several times, the sensitive loop including a plurality of read instructions in random-access memory, with for each instruction a predefined read address jump.

The number of executions of the sensitive loop is advantageously equal to a size of a line of the L2 cache memory divided by a size of the address jump in read mode. In this way it is possible to generate an eviction of cache line by executing, in a variant, the reference sensitive application, such as an eviction of the L2 cache line.

As an example, the sensitive loop includes four read instructions in random-access memory, such as LOAD instructions, with for each instruction a predefined read address jump, such as an address jump of 1 word. If the cache line has 16 words, then the sensitive loop [is] executed sixteen times (16 divided by 1). As is known per se, the size of the words depends on the platform 16, more particularly on the processor, the memories and the data bus. Conventionally, the words are 8-bit, 16-bit, 32-bit or 64-bit words. Herein, the words are, e.g., 32-bit words.

On the other hand, the reference contending application aims to handle elements that are as aggressive as possible, but that are sequenced so as to limit the contention to the predefined contention. The reference content application is, e.g., an application formed by a contending loop executed several times, the content loop including a plurality of write instructions in random-access memory, with a predefined write address jump for each instruction.

The number of executions of the contending loop is preferentially equal to a size of a line of the second-level cache divided by a size of the write address jump. In this way it is possible to generate an eviction of cache line by executing the reference sensitive application, such as an eviction of the L2 cache line.

As an example, the contending loop includes six instructions for writing to random-access memory, such as STORE instructions, with a predefined read address jump, such as an address jump of 4 words, for each instruction. If the cache line has 16 words, then the contending loop [is] executed four times (16 divided by 4). As indicated above, the words are e.g. 32-bit words.

During the preliminary phase 100, the reference contending application is then characterized in order to verify the level of contention that same generates, more particularly that the level of contention generated corresponds substantially to the predefined contention ratio.

During the preliminary phase 100, the reference contending application is, according to the invention, further used for determining the respective threshold for each characteristic variable Vi. In other words, the reference contending application makes it possible to determine an acceptable limit for each of the characteristic variables Vi observed, i.e., taken into account, during the subsequent monitoring of avionics software application(s) 14, Aj.

Whenever, as an advantageous supplement, each respective threshold Si is expressed per unit of time, the determination of each respective threshold Si from the reference contending application is then carried out by taking into account an observation period during which the characteristic variable Vi is observed for the reference contending application in order to determine the respective associated threshold. Each respective threshold Si is then determined by dividing, by the duration of observation, the limit value of the characteristic variable Vi resulting from the observation, in order to be thereby expressed per unit of time.

Each respective threshold Si is preferentially identical from one core to the other of the multi-core processor.

In a variant, each respective threshold Si is specific to a core of the multi-core processor, and is then potentially distinct from one core to another of the multi-core processor. According to such variant, a predefined contention level is provided separately for each of the cores, and a reference contending application is then also determined separately for each of the cores. In other words, according to such variant, the number of predefined contention levels, and hence the number of predefined contention ratios, as well as the number of reference contending applications, are then each equal to the number of cores of the multi-core processor.

According to such variant, in other words again, the choice of the predefined contention level, the determination of the reference contending application, and finally the determination of the respective threshold Si for each of the characteristic variables Vi is then specific to each core of the multi-core processor. The choice and the determinations, specific to each core of the multi-core processor, are then made separately for each core of the multi-core processor. The choice and the determinations are typically made by applying, for each respective core of the multi-core processor, the method described hereinabove for determining a respective threshold Si valid for all the cores. The determination method defined hereinabove is then implemented for one core after another of the multi-core processor.

The skilled person would then understand that if one of the avionics software applications 14, Aj monitored overruns one of the acceptable limits during the monitoring, then it means that the application concerned generates a more significant contention than the reference contending application, i.e., a contention of a level higher than the predefined contention level, chosen beforehand, and hence that the application concerned should be stopped, or killed, in order not to cause a too significant perturbation of the other avionics software applications executed in parallel by the multi-core processor.

The stopping module 26 is then, for each software application 14 being executed, configured to stop the execution of the respective software application 14 if at least one acquired value is higher than the respective threshold Si. In other words, the stopping module 26 is configured to kill, i.e., permanently interrupt, the execution of the respective software application 14 if at least one acquired value of a characteristic variable is, for the software application 14, higher than the respective threshold Si associated with the characteristic variable.

Figure 2:
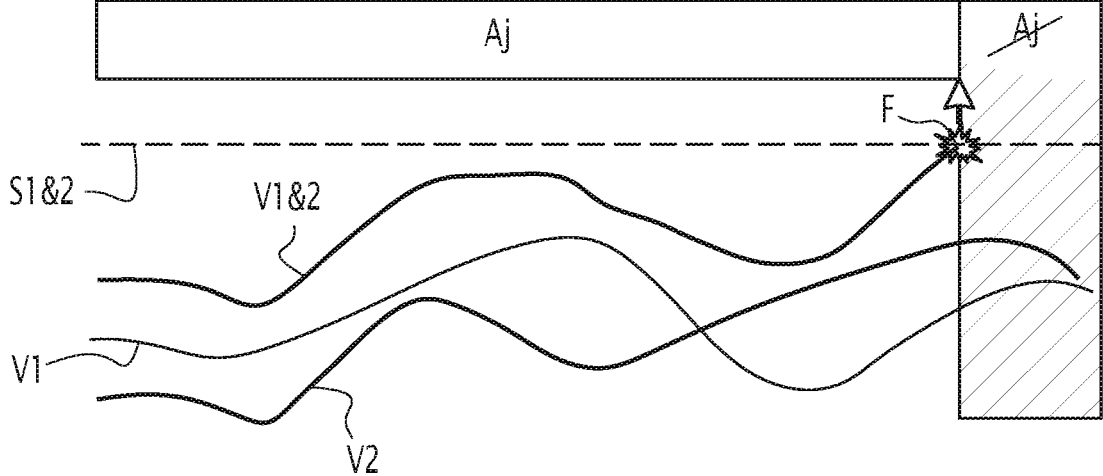
FIG. 2 is a schematic representation illustrating the acquisition of successive values of a plurality of characteristic variables representative of a use of the platform, for a respective software application, the comparison of successive values with a respective threshold for each characteristic variable, and stopping the execution of the monitored software application if at least one acquired value is higher than the respective threshold for the corresponding characteristic variable.

In the example shown in FIG. 2, illustrating the monitoring of the respective software application Aj, the curve corresponding to the characteristic variable V1&2, which is moreover a combined characteristic variable as explained hereinabove, crosses at an instant F, the threshold S1&2 associated with the combined characteristic variable V1&2. Because of the threshold exceeded, the software application Aj is then stopped, i.e. killed, at the instant F, as represented by the grayed out and hatched area, as well as the crossed-out notation Aj, after the time F.

Figure 3:
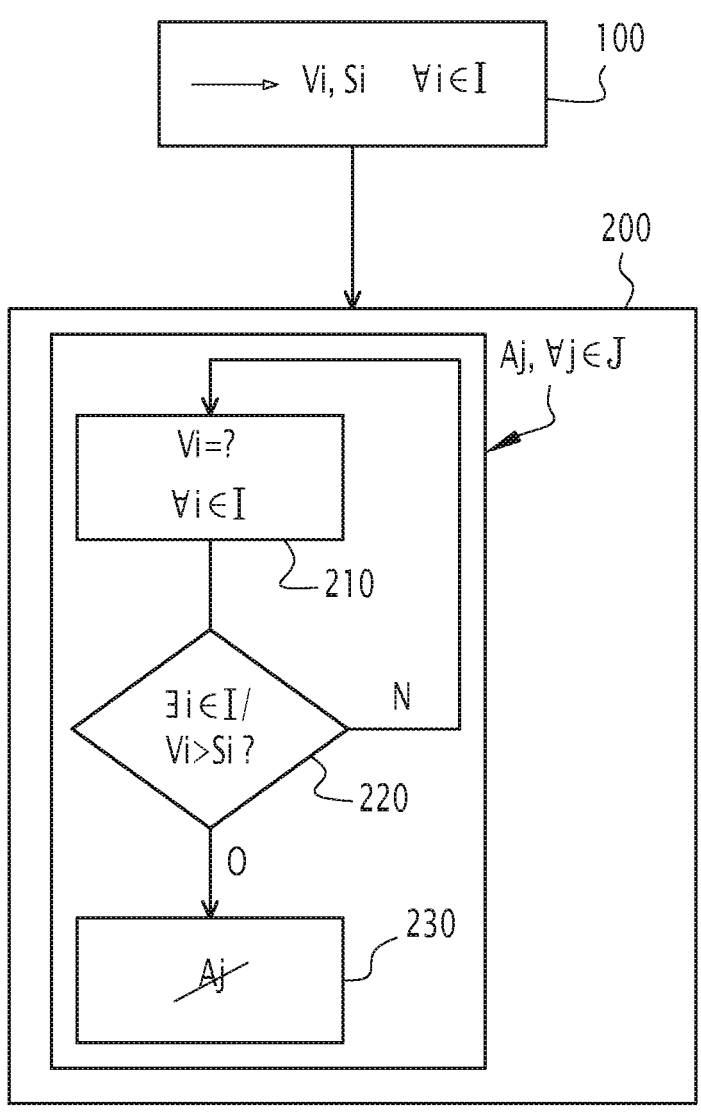
FIG. 3 is a flowchart of a method, according to the invention, for monitoring avionics software application(s) apt to be executed on the platform, the method being implemented by the monitoring device shown in FIG. 1.

The operation of the electronic monitoring device 20 according to the invention will now be described with reference to FIG. 3 representing a flowchart of the method, according to the invention, for monitoring avionics software application(s) 14 executed by the avionics platform 16 including the multi-core processor, the method being implemented by the electronic monitoring device 20.

The monitoring method includes first of all, a preliminary phase 100, described hereinabove, followed by a monitoring phase 200. Each characteristic variable Vi or each threshold Si is preferentially defined with respect to time, i.e., expressed per unit of time. The acquisition of each characteristic variable Vi is then carried out by taking into account a time of acquisition in order to express each acquired value per unit of time. Similarly, the comparison thresholds are determined with respect to the acquisition time, i.e., by taking into account a time of acquisition in order to express each threshold Si per unit of time.

The preliminary phase 100 makes it possible to determine the set of a characteristic variable(s) Vi, i.e., each characteristic variable Vi for any index I belonging to the set I, as well as the set of threshold(s) Si each corresponding to a characteristic variable, i.e. each threshold Si for any index I belonging to the set I, as represented in FIG. 3. At the end of the preliminary phase 100, each threshold Si is, e.g., defined proportionally to a nominal value of the associated characteristic variable Vi. In other words, each threshold Si is then equal to the nominal value of the characteristic variable Vi multiplied by a multiple ai, the multiple ai being a real number strictly greater than 1.

The monitoring phase 200 is then performed for each of the monitored avionics software applications 14, i.e., for each software application Aj being executed, and for any index j belonging to the set J containing the indices of the monitored avionics software applications 14.

The monitoring phase 200 includes an initial acquisition operation 210 during which the monitoring device 20 acquires, via the acquisition module 22 thereof, the value of at least one characteristic variable Vi representative of the use of the platform 16. The acquisition module 22 then typically acquires one or a plurality of performance measurement register values, also denoted by PMRi.

Each characteristic variable Vi the value of which is acquired by the acquisition module 22 is e.g. the occupied bandwidth of the random-access memory bus, the number of first level cache misses, the number of second level cache misses, or the number of page changes in DDR mode; or a combination of the variables.

At the end of the acquisition operation 210, the monitoring phase 200 includes a comparison operation 220 during which the monitoring device 20 compares, via the comparison module 24 thereof, each acquired value of a characteristic variable Vi, preferentially reduced to the unit of time, with a respective threshold Si which is also preferentially reduced to the unit of time, corresponding to the characteristic variable Vi.

During the comparison operation 220, the comparison module 24 determines more particularly whether the acquired value of the characteristic variable Vi is higher than the respective threshold Si, and, where appropriate, moves to the next stop operation 230.

Otherwise, if the acquired value of the characteristic variable Vi is less than or equal to the respective threshold Si, then the monitoring device 20 returns to the initial acquisition operation 210 for performing a new acquisition of the value(s) of the characteristic variable(s) Vi.

If the comparison operation 220 results in the detection of at least one crossing of the respective threshold Si, then the monitoring phase 200 includes the stopping operation 230 following the comparison operation 220.

During the stopping operation 230, the monitoring device 20 stops, via the stopping module 26 thereof, the execution of the or each respective software application for which at least one acquired value of a characteristic variable Vi is higher than the respective threshold Si corresponding to the characteristic variable Vi.

The stopping operation 230 is thus used for stopping, i.e., killing or even permanently interrupting, the or each software application generating a contention higher than the predefined contention level, characterized by the reference contending application which has served to determine the set of a characteristic variable(s) Vi and the set of threshold(s) Si.

At the end of the stopping operation 230, the monitoring device 20 returns to the initial acquisition operation 210 to perform a new acquisition of value(s) of a characteristic value(s) Vi for each software application Vj still being executed.

The skilled person would then understand that, during the monitoring phase 200, the acquisition 210, the comparison 220 and, where appropriate, the stopping operations 230 are performed, preferentially in parallel, for each software application Aj.

The monitoring phase 200 is, e.g., performed, i.e., implemented, during each call for an application sent to the operating system 18. In other words, the acquisition 210 and the comparison operations 220 are then reiterated during each call sent to the operating system 18.

In addition or in a variant, the operating system 18 is an operating system operating synchronously with periodic system events, and the monitoring phase 200 is performed at each system event. In other words, the acquisition 210 and the comparison operations 220 are then reiterated at each system event.

It is thereby conceivable that the monitoring device 20 and the monitoring method according to the invention lead to monitoring, more effectively, the at least one avionics software application 14.

More particularly, the monitoring device 20 and the monitoring method according to the invention make it possible to anticipate contention and to sanction the application or the applications which are the cause of the slowdowns experienced by the other applications, rather than basically sanctioning the avionics software application(s) 14 that would overrun the time budget thereof, i.e., the allocation thereof, while the applications are not necessarily at the origin of the contention.

The invention claimed is:

1. A method for monitoring avionics software applications executed by an avionics platform that is carried on-board an aircraft, the avionics platform including a multi-core processor and hosting an operating system, the method being implemented by an electronic monitoring device and comprising, for each software application being executed:

a monitoring phase including:

acquisition of a value of at least one characteristic variable representative of a use of the platform, each acquired value of a characteristic variable being associated with a respective software application;

comparison of each acquired value with a respective threshold corresponding to the characteristic variable; and stopping execution of the respective software application if at least one acquired value is higher than the respective threshold, while one or more other software applications execute in parallel, and when execution the respective software application is stopped, the other software application(s) continue executing; and a preliminary phase preceding said monitoring phase of each software application, the preliminary phase comprising, for each characteristic variable, determining the respective threshold as the value of the characteristic variable taken for a pre-defined reference contending application during execution of the reference contending application and a pre-defined reference sensitive application, the reference contending application causing an increase in the execution time of the reference sensitive application according to a pre-defined contention ratio, the contention ratio being equal to an execution time of the reference sensitive application when executed at a same time as the reference contending application divided by an execution time of the reference sensitive application when executed alone by the platform.

2. The method according to claim 1, wherein each characteristic variable and each associated respective threshold are each expressed per unit of time.

3. The method according to claim 1, wherein the platform includes memory resources including a random-access memory, a first level cache and a second level cache, and each characteristic variable is a variable representative of the use of the memory resources.

4. The method according to claim 3, wherein each characteristic variable is chosen from the group consisting of: (i) an occupied bandwidth of an access bus to the random-access memory, (ii) a number of first level cache misses, (iii) a number of second level cache misses, (iv) a number of third level cache misses, (v) a number of page changes in DDR mode, and (vi) a combination of variables (i)-(v).

5. The method according to claim 3, wherein in said preliminary phase, the reference contending application is an application formed by a contending loop executed several times, the contending loop including a plurality of write instructions in random-access memory, with a predefined write address jump for each instruction.

6. The method according to claim 5, wherein the number of executions of the contending loop is equal to a size of a line of the second-level cache divided by a size of the write address jump.

7. The method according to claim 3, wherein in said preliminary phase, the reference sensitive application is an application formed by a sensitive loop executed several times, the sensitive loop comprising a plurality of read instructions in random-access memory, with a predefined read address jump for each instruction.

8. The method according to claim 7, wherein the number of executions of the sensitive loop is equal to a size of a line of the second level cache divided by a size of the read address jump.

9. The method according to claim 1, wherein in said acquisition, each value of a characteristic variable is acquired separately for each of the cores of the multi-core processor.

10. The method according to claim 1, wherein said acquisition and said comparison are reiterated at each call sent to the operating system.

11. The method according to claim 1, wherein the operating system is an operating system operating synchronously with periodic system events, and said acquisition and said comparison are reiterated at each system event.

12. A non-transitory computer-readable medium including a computer program including software instructions which, when executed by a computer, implement a method according to claim 1.

13. An electronic device for monitoring avionics software applications executed by an avionics platform that is carried on-board an aircraft, the avionics platform including a multi-core processor and hosting an operating system, the monitoring device comprising:

an acquisition module configured for acquiring, for each software application being executed, a value of at least one characteristic variable representative of a use of the platform, each acquired value of a characteristic variable being associated with the respective software application;

a comparison module configured to compare, for each software application being executed, each acquired value with a respective threshold corresponding to the characteristic variable; and a stopping module configured to stop, for each software application being executed, execution of the respective software application if at least one acquired value is higher than the respective threshold, while one or more other software applications execute in parallel, and when the respective software application is stopped, the other software application(s) continue executing, wherein, for each characteristic variable, the respective threshold is determined as the value of the characteristic variable taken for a pre-defined reference contending application during execution of the reference contending application and a pre-defined reference sensitive application during a preliminary phase, the reference contending application causing an increase in the execution time of the reference sensitive application according to a predefined contention ratio, the contention ratio being equal to an execution time of the reference sensitive application when executed at the same time as the reference contending application divided by an execution time of the reference sensitive application when executed alone by the platform, the preliminary phase preceding the monitoring of each software application.

14. An avionics electronic system comprising:

a memory storing at least one avionics software application;

a platform executing each avionics software application, the platform hosting an operating system; and an electronic device according to claim 13 for monitoring each avionics software application.

\* \* \* \* \*